United States Patent
Jang

(10) Patent No.: US 9,071,802 B2
(45) Date of Patent: Jun. 30, 2015

(54) DISPLAY APPARATUS AND CONTROL METHOD THEREOF

(71) Applicant: SAMSUNG ELECTRONICS CO., LTD., Suwon-si (KR)

(72) Inventor: Beom-soon Jang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/919,372

(22) Filed: Jun. 17, 2013

(65) Prior Publication Data

US 2014/0036151 A1    Feb. 6, 2014

(30) Foreign Application Priority Data

Aug. 2, 2012    (KR) .................. 10-2012-0084669

(51) Int. Cl.
- H04N 5/93        (2006.01)
- H04N 5/63        (2006.01)
- H04N 21/488      (2011.01)

(52) U.S. Cl.
CPC ............. *H04N 5/63* (2013.01); *H04N 21/4882* (2013.01)

(58) Field of Classification Search
None
See application file for complete search history.

(56) References Cited

U.S. PATENT DOCUMENTS

| 6,344,878 | B1  |     | 2/2002  | Emura |
|-----------|-----|-----|---------|-------|
| 2007/0200952 | A1 |   | 8/2007  | Senoo |
| 2008/0062333 | A1 |   | 3/2008  | Iwahashi |
| 2009/0165044 | A1 | * | 6/2009  | Collet et al. .................... 725/38 |
| 2011/0279393 | A1 | * | 11/2011 | Okada et al. ................. 345/173 |
| 2013/0100017 | A1 | * | 4/2013  | Papakipos et al. ............ 345/158 |

FOREIGN PATENT DOCUMENTS

| KR | 1999-004335 A  | 1/1999 |
| KR | 10-0732679 B1  | 6/2007 |

OTHER PUBLICATIONS

Communication from the European Patent Office issued Nov. 28, 2013 in a counterpart European Application No. 13171644.1.

* cited by examiner

*Primary Examiner* — William C Vaughn, Jr.
*Assistant Examiner* — Eileen Adams
(74) *Attorney, Agent, or Firm* — Sughrue Mion, PLLC

(57) ABSTRACT

A display apparatus includes a display unit; a storage unit which stores user setting information which is set based on an input from a user; and a controller which checks whether the user setting information is stored in the storage unit and displays the stored user setting information on the display unit before the display apparatus is turned off, when a power-off signal of the display apparatus is received from the user.

14 Claims, 5 Drawing Sheets

DISPLAY APPARATUS AND CONTROL METHOD THEREOF

CROSS-REFERENCE TO RELATED APPLICATION

This application claims priority from Korean Patent Application No. 10-2012-0084669, filed on Aug. 2, 2012, in the Korean Intellectual Property Office, the disclosure of which is incorporated herein by reference in its entirety.

BACKGROUND

1. Field

Apparatuses and methods consistent with exemplary embodiments relate to a display apparatus and a control method thereof, and more particularly, to a display apparatus and a control method thereof which performs a timer recording or timer viewing according to a user's setting.

2. Description of the Related Art

A display apparatus may be implemented as a television (TV) system which receives an image signal from an external image supply source, and processes and displays the image signal. Based on developed digital technology, a digital TV has extensive TV functions and improved channel tuning, image processing, image recording functions and other basic functions compared to an existing analog TV. In particular, the digital TV may store therein an image signal transmitted to a hard disc drive, in a form of a file, through a personal video recorder (PVR).

A user may set an automatic operation which is performed after the display apparatus is turned off. For example, the user may use the PVR function to perform a timer recording with respect to a signal of a particular channel at a particular time even after a screen is turned off, and set a timer viewing to turn on the display apparatus at a particular time.

The aforementioned settings are maintained even if the display apparatus is turned off, and in particular, the timer recording is performed while the screen is not turned on. Thus, a user may have difficulty recognizing when the timer recording is being performed while the screen is not turned on. A related art display apparatus requires a user to select a timer recording menu from an entire menu to check a list of timer recordings. Accordingly, to check the details of the timer recordings after the display apparatus is turned off, the user needs to turn on the display apparatus and enter the timer recording menu, which causes inconvenience to the user.

SUMMARY

One or more exemplary embodiments provide a display apparatus and a control method thereof which enables a user to recognize user setting information such as timer recording without any additional manipulation.

According to an aspect of an exemplary embodiment, there is provided a display apparatus including: a display unit; a storage unit which stores user setting information which is set based on an input from a user; and a controller which determines whether the user setting information is saved in the storage unit and displays the stored user setting information on the display unit before the display apparatus is turned off, when a power-off signal of the display apparatus is received.

When the power-off signal of the display apparatus is received, the controller may turn off the display apparatus after displaying the user setting information for a predetermined time.

The controller may turn off the display apparatus before the predetermined time elapses if the power-off signal is again received.

The user setting information may include at least one of setting information on timer recording and setting information on timer viewing.

The controller may display a user interface (UI) through which the user setting information is changeable.

The controller may display the user setting information on the display unit in an electronic program guide (EPG).

According to an aspect of another exemplary embodiment, there is provided a control method of a display apparatus including: storing user setting information which is set based on an input from a user; receiving a power-off signal of the display apparatus from a user; in response to receiving the received power off signal, determining whether the user setting information is stored; if it is determined that the user setting information is stored, the user setting information is stored, displaying the stored user setting information; and after the displaying the stored user setting information, turning off the display apparatus.

The turning off the display apparatus may include turning off the display apparatus after displaying the user setting information for a predetermined time.

The display apparatus may be turned off before the predetermined time elapses if the power-off signal is again received.

The user setting information may include at least one of setting information on timer recording and setting information on timer viewing.

The displaying the stored user setting information may include displaying the user setting information in a user interface (UI) through which the user setting information is changeable.

The displaying the stored user setting information may include displaying the user setting information in an electronic program guide (EPG).

The user setting information may include setting information of at least one function which is performed when the display apparatus is turned off.

The user setting information may include setting information of at least one function which is performed when the display apparatus is turned off.

According to an aspect of another exemplary embodiment, there is provided a control method of a display apparatus including a display unit, the control method including: receiving user setting information for at least one function of the display apparatus; receiving a power-off signal of the display apparatus; and in response to the receiving the power-off signal, displaying the user setting information through the display unit and then turning off the display apparatus.

The at least one function may be performed when the display apparatus is turned off.

The at least one function may be timer recording or timer viewing.

The user setting information may be displayed on the display unit for a predetermined time.

The display apparatus may be turned off before the predetermined time elapses if the power-off signal is again generated.

The method may further include displaying a user interface (UI), through which the user setting information is changeable, with the user setting information on the display unit.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
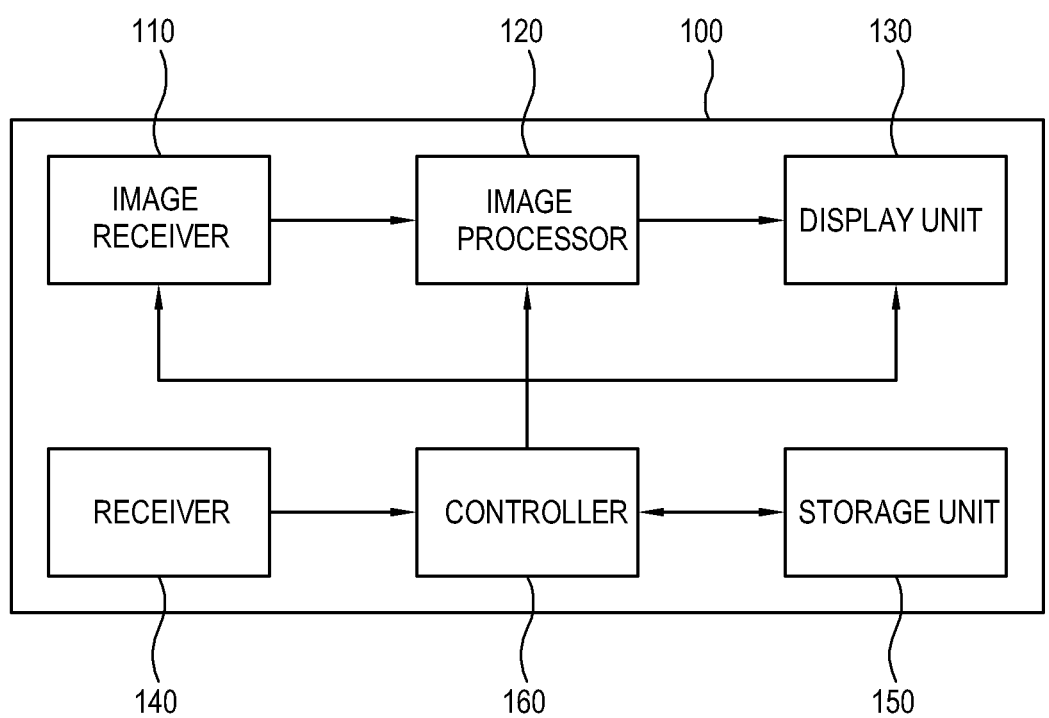
FIG. 1 is a block diagram of a display apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a block diagram of a display apparatus 100 according to an exemplary embodiment.

As shown therein, the display apparatus 100 according to an embodiment includes an image receiver 110, an image processor 120, a display unit 130, a receiver 140, a storage unit 150, and a controller 160. The display apparatus 100 may be implemented as a digital television (DTV).

The image receiver 110 may be implemented as a radio frequency (RF) tuner to receive an image signal from an external image supply source and receive an RF broadcasting signal from a broadcasting station. The image receiver 110 may receive an image signal of a channel that is selected based on a user's input, and receive an image signal of a particular channel regardless of whether the image signal is displayed on the display unit 130 if a recording function is set.

The image processor 120 processes an image signal received through the image receiver 110, according to a preset image processing operation. For example, the image processing operation of the image processor 120 includes, but not limited to, decoding, de-interlacing, scaling, noise reduction, and detail enhancement operations.

The image processor 120 may be implemented as a system-on-chip (SOC), which integrates the aforementioned functions, or as an image processing board, which includes individual elements, circuits or chips performing each process independently.

The display unit 130 displays thereon a graphic layer which is generated separately from an image, and includes an electronic program guide (EPG) and a user interface (UI) for setting user setting information, together with the image based on the image signal processed by the image processor 120. The display unit 130 may be implemented as various panels including a plasma display panel (PDP), a liquid crystal display (LCD) panel, an organic light emitting diode (OLED) display panel and a flexible display.

The receiver 140 receives a user's input. The user's input includes known commands for controlling the display apparatus 100, such as power on-off, change of channel and/or volume, and timer recording. The receiver 140 may be implemented as a wireless communication module to receive a signal according to the user's input from an external remote control device according to known wireless communication standards such as infrared (IR), Bluetooth, etc. Alternatively, the receiver 140 may be implemented as a keypad which is provided in an external side of the display apparatus 100 and includes a plurality of keys.

The storage unit 150 stores therein user setting information which is set based on the user's input. The storage unit 150 may be implemented as a non-volatile memory such as a flash memory or a hard disc drive. The storage unit 150 may store therein processed image signals and various data for UIs, in addition to the user setting information.

The user setting information may be defined as setting information of a group of functions which are generated based on a user's input through the receiver 140 and performed by the display apparatus 100. In particular, in an exemplary embodiment, the user setting information may include setting information about a series of functions, such as timer recording and timer viewing, which may be performed when the display apparatus 100 is soft-off, i.e., even if power is supplied to the display apparatus 100 but is not supplied internally to an operating system.

The controller 160 controls overall operations of the display apparatus 100. The controller 160 may include a control program (not shown), a non-volatile memory (not shown) such as a read only memory (ROM) and a flash memory storing therein the control program, a volatile memory (not shown) such as a random access memory (RAM) on which at least a part of the stored control program is loaded, and a microprocessor (not shown) such as a central processing unit (CPU) and a micro control unit (MCU) executing the loaded control program. The controller 160 may include a micom which receives power, monitors the user's input and performs a standby operation even if the display apparatus 100 is soft-off.

If a power-off signal of the display apparatus 100 is received through the receiver 140, the controller 160 checks whether user setting information is stored in the storage unit 150. Generally, if the power-off signal of the display apparatus 100 is received, the display apparatus 100 immediately shuts off power supplied to main elements including the display unit 140. However, the controller 160 of the display apparatus 100 according to an exemplary embodiment displays the stored user setting information on the display unit 130 before the power-off operation is performed.

The controller 160 turns off the display apparatus 100 after the user setting information is displayed for a predetermined time. A related art display apparatus requires a user to firstly turn on the display apparatus and then enter a certain menu to check the user setting information when the display apparatus is turned off. However, the display apparatus 100 according to an exemplary embodiment displays the user setting information for a predetermined time before being turned off upon receiving the power-off signal. Thus, the user may check the user setting information in a simpler manner than the related art display apparatus.

The predetermined time during which the user setting information is displayed may be adjusted by an additional setting. If the power-off signal is received again through the receiver 140 even before the predetermined time elapses, the controller 160 may immediately turn off the display apparatus 100. That is, the user may turn off the display apparatus 100 after checking the user setting information even before the predetermined time elapses.

Figure 2:
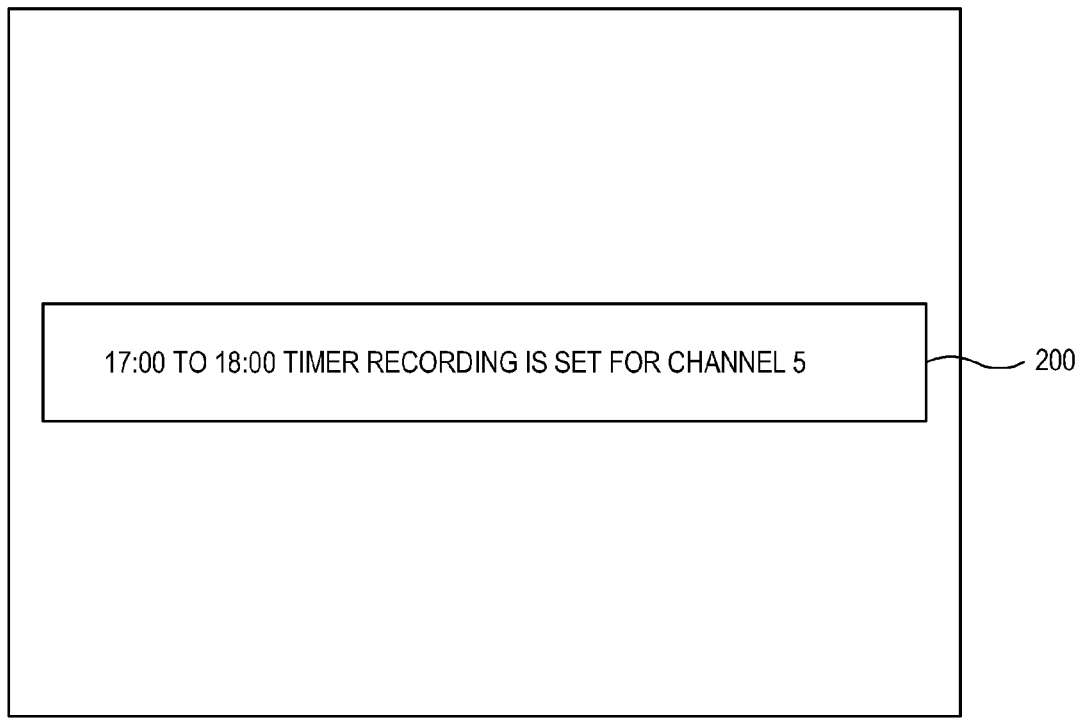
FIGS. 2 to 4 illustrate exemplary screens on which user setting information is displayed.
Figure 3:
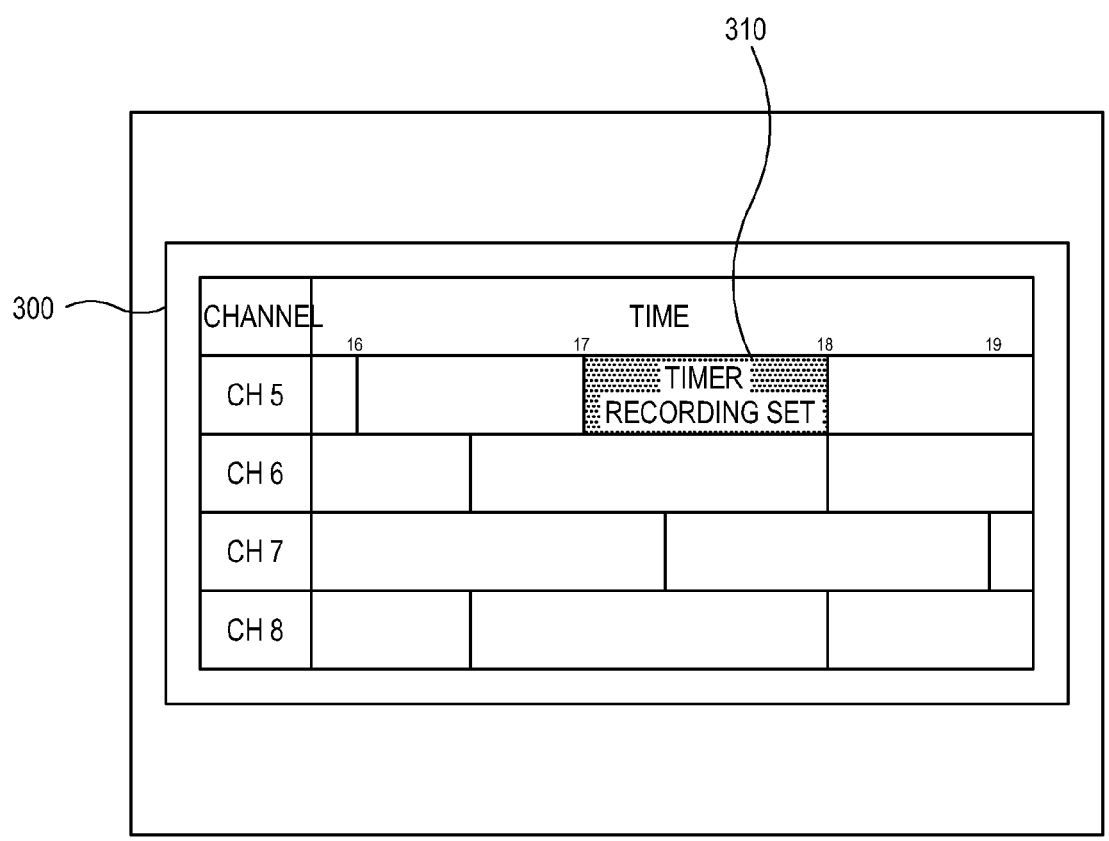
Figure 4:
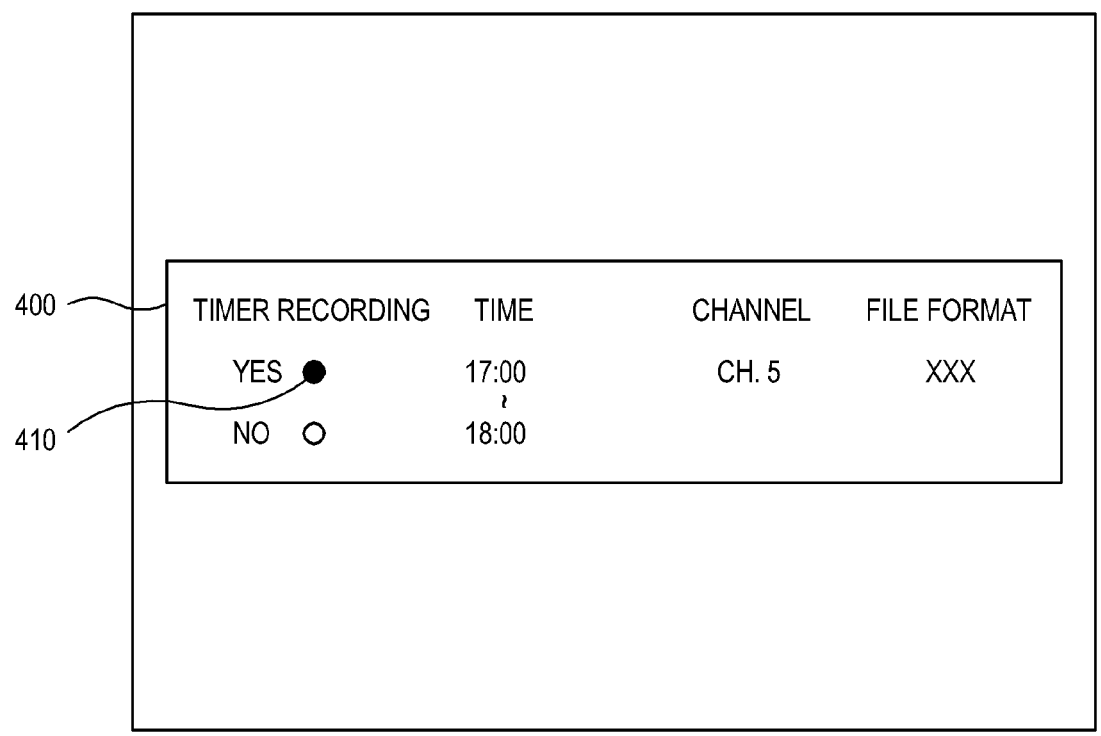

FIGS. 2 to 4 illustrate other exemplary embodiments for displaying user setting information.

As shown in FIG. 2, the user setting information may be displayed in the form of a text. For example, if the user previously sets a timer recording for a channel no. 5 from 17:00 to 18:00 before turning off the display apparatus 100, the display apparatus 100 may display a text 200 including brief information on the timer recording.

As shown in FIG. 3, the display apparatus 100 displays an electronic program guide (EPG) 300, and may display a program in a highlighted form 310 for which the timer recording has been set. Also, the display apparatus 100 may display a text message indicating that the timer recording is set for the highlighted program.

According to another exemplary embodiment, the controller 160 may display a user interface (UI) 400 to display current user setting information if a power-off signal is received. As shown in FIG. 4, the UI 400 displays whether the timer recording is set to "YES" as shown in 410. Also, the UI 400 displays a list of currently-set timer recordings, and the user may cancel or change time, channel or file format of the set timer recordings through the displayed UI.

The display apparatus 100 according to an exemplary embodiment enables the user to recognize the set user setting information without additional manipulation before the display apparatus 100 is turned off.

Figure 5:
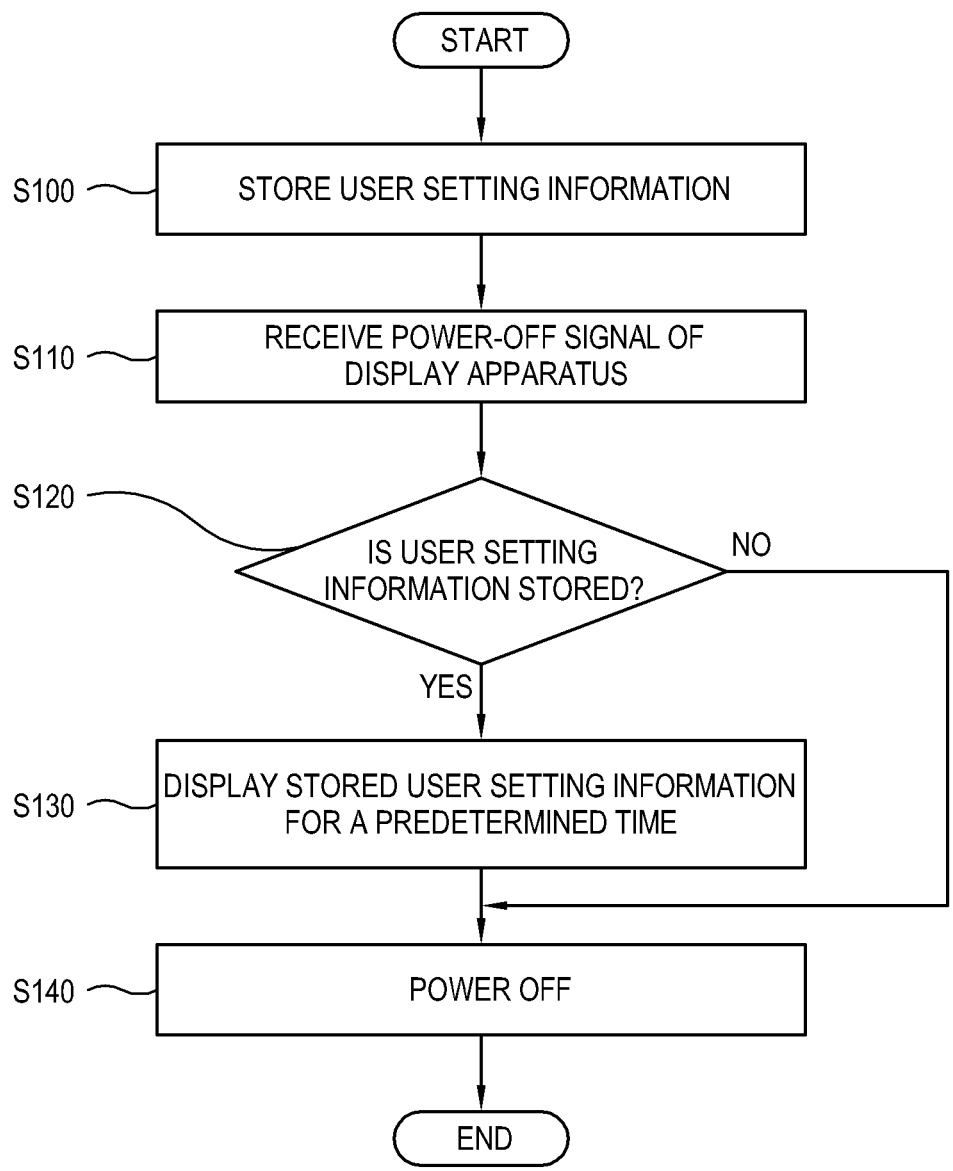
FIG. 5 is a flowchart of operating a display apparatus according to an exemplary embodiment.

FIG. 5 is a flowchart of operating a display apparatus according to an exemplary embodiment.

The display apparatus 100 stores the user setting information which is set based on the user's input (S100). As explained above, the user setting information may include information about a series of functions which may be performed when the display apparatus 100 is soft off, such as setting information on timer recording and timer viewing.

The display apparatus 100 receives the power-off signal from the user (S110). If the power-off signal is received, the controller 160 checks whether the user setting information is stored in the display apparatus 100 rather than immediately turning off the display apparatus 100 (S120).

If the user setting information is stored, the user setting information is displayed before the display apparatus 100 is turned off (S130). The user setting information may be displayed in the form of a text or EPG. A UI may be displayed to allow the user to change the user setting information. This has been explained with reference to FIGS. 2 to 4.

The predetermined time during which the user setting information is displayed may be adjusted by an additional setting, and after the predetermined time elapses, the display apparatus 100 is turned off (S140). If the power-off signal is received again even before the predetermined time elapses, the controller 160 may immediately turn off the display apparatus 100.

By the control method of the display apparatus according to an exemplary embodiment, the user may recognize the user setting information without additional manipulation before the display apparatus is turned off.

As described above, a display apparatus and a control method thereof enables the user to recognize user setting information such as timer recording without additional manipulation.

Although a few exemplary embodiments have been shown and described, it will be appreciated by those skilled in the art that changes may be made in these exemplary embodiments without departing from the principles and spirit of the inventive concept, the range of which is defined in the appended claims and their equivalents.

What is claimed is:

1. A display apparatus comprising:
 a display unit;
 a receiver configured to receive a broadcasting signal;
 a storage unit configured to store setting information on timer recording or timer viewing of the received broadcasting signal which is set based on an input from a user; and
 a controller configured, when a power-off signal of the display apparatus is received, to display the setting information on timer recording or timer viewing, which is stored in the storage unit before the power-off signal of the display apparatus is received, on the display unit and to turn off the display unit after the display unit displays the setting information on timer recording or timer viewing for a predetermined time from when the power-off signal of the display apparatus is received.

2. The display apparatus according to claim 1, wherein the controller turns off the display apparatus before the predetermined time elapses if the power-off signal is again received.

3. The display apparatus according to claim 1, wherein the controller displays a user interface (UI) through which the setting information on timer recording or timer viewing is changeable.

4. The display apparatus according to claim 1, wherein the controller displays the setting information on timer recording or timer viewing on the display unit in an electronic program guide (EPG).

5. The display apparatus according to claim 1, wherein the setting information on timer recording or timer viewing comprises setting information on timer recording or timer viewing which is performed when the display apparatus is turned off.

6. A control method of a display apparatus comprising a display unit, the control method comprising:
 receiving a broadcasting signal;
 storing setting information on timer recording or timer viewing of the received broadcasting signal which is set based on an input from a user;
 receiving a power-off signal of the display apparatus from a user;
 in response to receiving the power-off signal, displaying the stored setting information on timer recording or timer viewing, which is stored before the power-off signal of the display apparatus is received; and
 turning off the display unit after the display unit displays the setting information on timer recording or timer viewing for a predetermined time from when the power-off signal of the display apparatus is received.

7. The control method according to claim 6, wherein the display apparatus is turned off before the predetermined time elapses if the power-off signal is again received.

8. The control method according to claim 6, wherein the displaying the stored setting information on timer recording or timer viewing comprises displaying the setting information on timer recording or timer viewing in a user interface (UI) through which the setting information on timer recording or timer viewing is changeable.

9. The control method according to claim 6, wherein the displaying the stored setting information on timer recording or timer viewing comprises displaying the setting information on timer recording or timer viewing in an electronic program guide (EPG).

10. The control method according to claim 6, wherein the setting information on timer recording or timer viewing comprises setting information on timer recording or timer viewing which is performed when the display apparatus is turned off.

11. A control method of a display apparatus comprising a display unit, the control method comprising:
 receiving a broadcasting signal;
 receiving setting information on timer recording or timer viewing of the received broadcasting signal;
 receiving a power-off signal of the display apparatus; and
 in response to the receiving the power-off signal, displaying the setting information on timer recording or timer viewing, which is stored before the power-off signal of the display apparatus is received, through the display unit and then turning off the display unit after the display unit displays the setting information on timer recording or timer viewing for a predetermined time from when the power-off signal of the display apparatus is received.

12. The control method according to claim 11, wherein timer recording or timer viewing is performed when the display apparatus is turned off.

13. The control method according to claim 12, wherein the display apparatus is turned off before the predetermined time elapses if the power-off signal is again generated.

14. The control method according to claim 12, further comprising displaying a user interface (UI), through which the setting information on timer recording or timer viewing is changeable, with the setting information on timer recording or timer viewing on the display unit.

* * * * *